Sept. 11, 1923.
L. L. DUBOIS
1,467,894
AGRICULTURAL IMPLEMENT
Filed Sept. 15, 1920
4 Sheets-Sheet 1
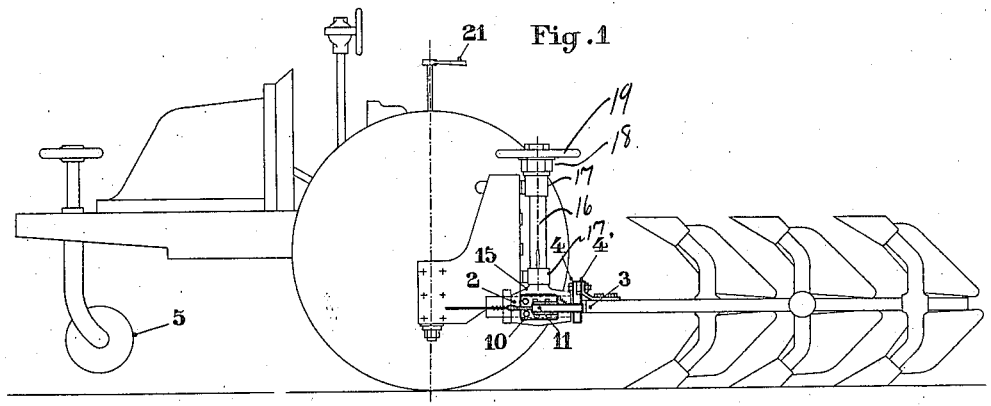
Fig. 1
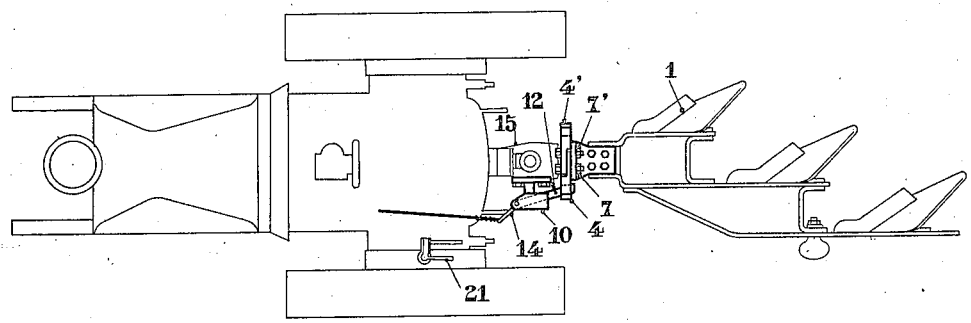
Fig. 2
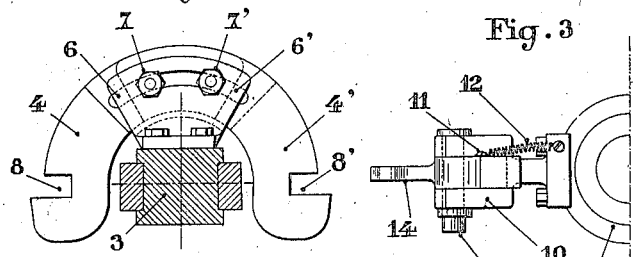
Fig. 5  Fig. 3
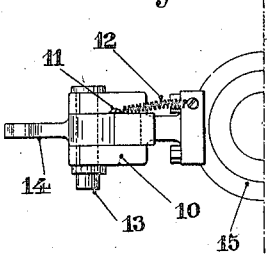
Fig. 4
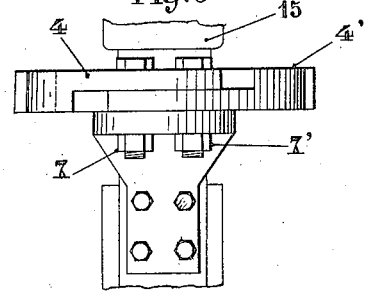
Fig. 6
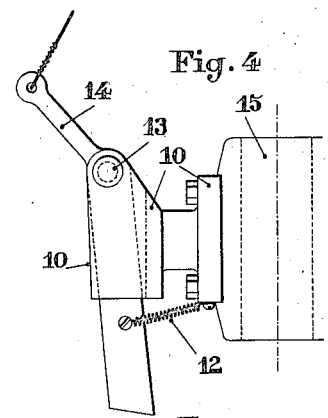
Inventor
L. L. Dubois
By Lawrence Langner
Att'y Sept. 11, 1923.  L. L. DUBOIS  1,467,894
AGRICULTURAL IMPLEMENT
Filed Sept. 15, 1920    4 Sheets-Sheet 2
Fig. 1ᶜ
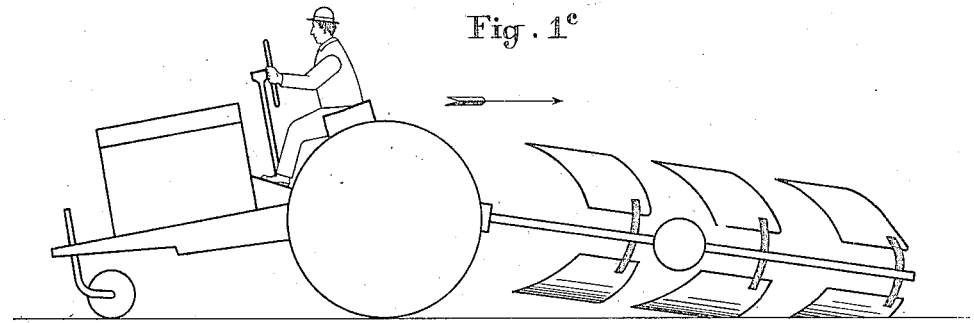
Fig. 1ᵃ
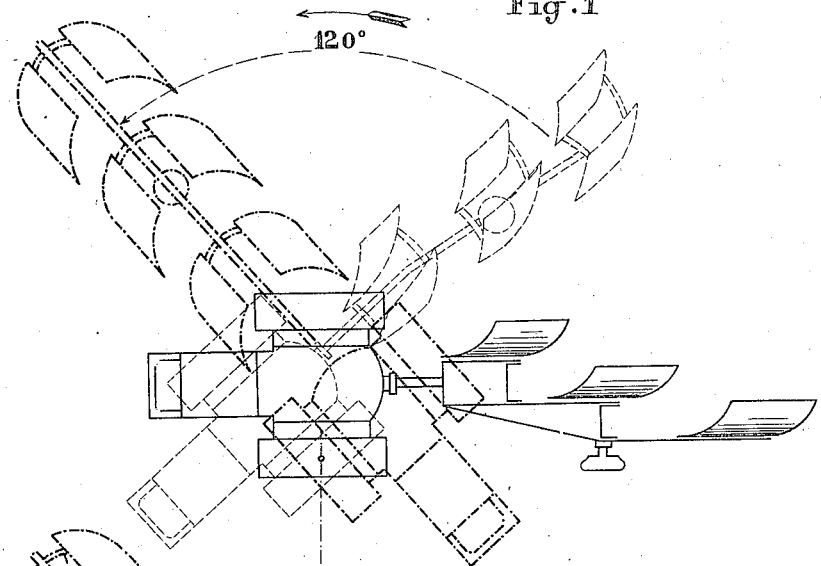
Fig. 1ᵇ
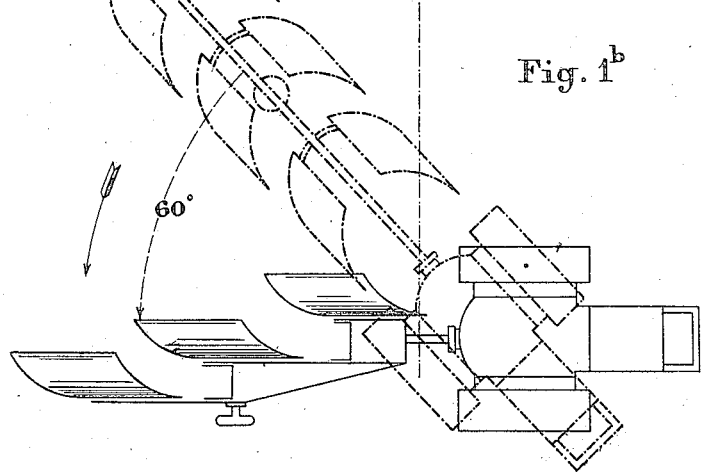

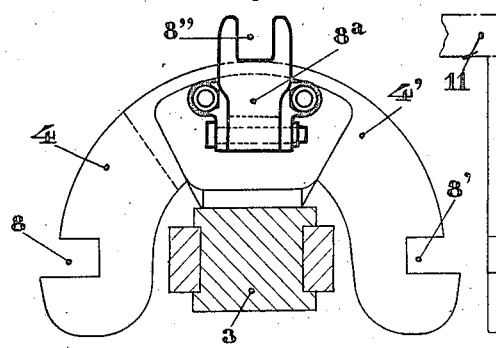
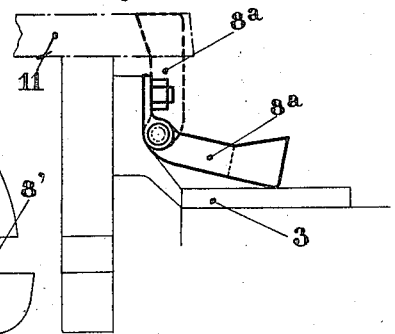
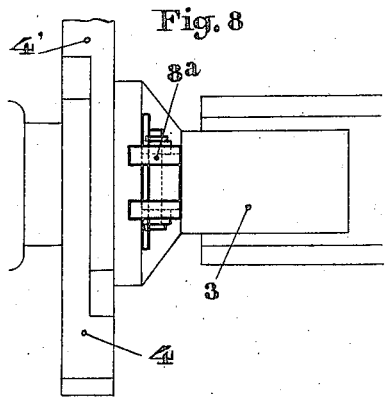
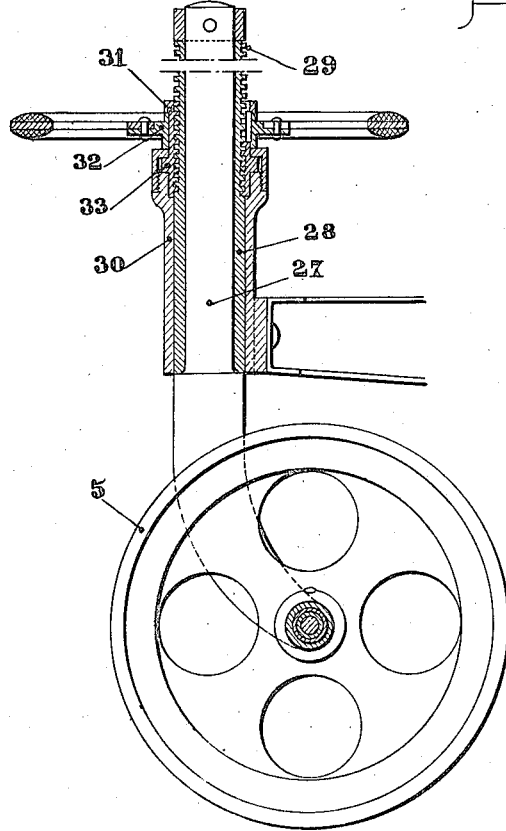

Sept. 11, 1923.  1,467,894
L. L. DUBOIS
AGRICULTURAL IMPLEMENT
Filed Sept. 15, 1920    4 Sheets-Sheet 4

Inventor
Lubin Louis Dubois
By Lawrence Langner
Attorney

Patented Sept. 11, 1923.

1,467,894

UNITED STATES PATENT OFFICE.

LUBIN LOUIS DUBOIS, OF ASNIERES, FRANCE.

AGRICULTURAL IMPLEMENT.

Application filed September 15, 1920. Serial No. 410,567.

*To all whom it may concern:*

Be it known that I, LUBIN LOUIS DUBOIS, a citizen of the French Republic, residing in Asnieres, France, have invented new and useful Improved Agricultural Implements, of which the following is a specification.

This invention relates to tractor-drawn multiple plows having two sets of plows mounted in diametrically opposed relation upon the same beam, the object of the invention being to provide a combined tractor and plow structure whereby the multiple plow can be automatically rotated on the axis of its beam at the end of a furrow to carry one set of plows out of and the other set into operative position with means for thereafter automatically locking the beam against rotation.

In carrying out my invention I provide a tractor having a pair of rear tractor wheels mounted on an axis with means for driving said wheels independently forwards and backwards and with independent brake means for each wheel, said tractor brake also having a front swivel wheel normally positioned above the ground and the tractor being constructed to tip about the axis of said tractor wheels to bring said front swivel wheel into contact with the ground when the tractor is backed at the end of a furrow. I further provide a vertically adjustable socket on the tractor in which the plow beam is journalled at its front end with manually releasable locking means carried in part by the tractor and in part by the plow beam for automatically locking the plow beam against further rotation when it has been rotated at the end of a furrow to carry one set of plows out of and the other set into operative position.

The invention is illustrated by way of example on the accompanying drawing wherein—

Fig. 1 is a side elevation of a double three-furrowed Brabant plough connected with a tractor of the type described in the application for a patent filed by applicant in the United States of America under the Serial Number 392793.

Fig. 1ᶜ is a view of the tractor and plow when the end of a furrow is reached and the driver begins to move backwards.

Fig. 1ᵃ is a diagrammatic view illustrating the turning of the plow through 120° with the brake applied to the land wheel.

Fig. 1ᵇ is a view illustrating the turning of the plow through the final 60° with the brake applied to the furrow wheel.

Fig. 2 is a plan view of the plough.

Fig. 3 is an enlarged end view of the supporting bush on the tractor frame.

Fig. 4 is a plan view thereof.

Fig. 5 is an enlarged plan view showing a preferred means for supporting the plough on the tractor.

Fig. 6 is a plan view thereof.

Fig. 7 is an end elevation of a modified means of support.

Fig. 8 is a plan view of said means.

Fig. 9 is a view in profile showing a detail.

Fig. 13 is a side elevation of a regulatable swivel wheel at the front of the tractor.

Figure 10:
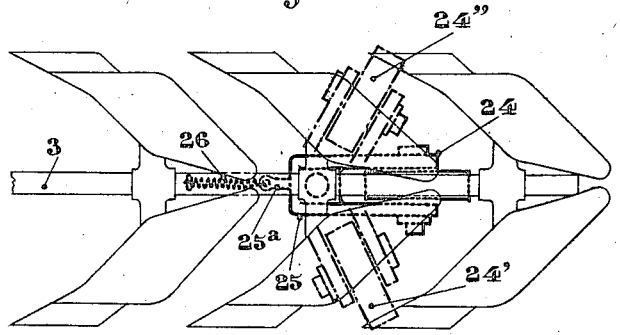
Fig. 10 is a plan view of the plough with the parts thereof raised from the ground.
Figure 11:
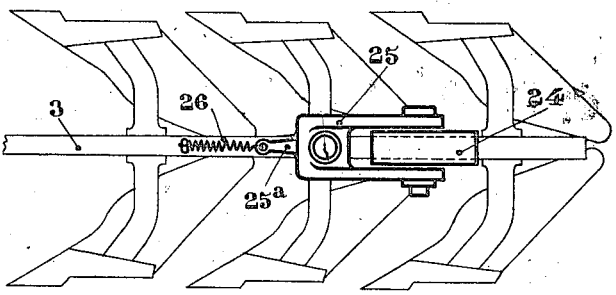
Fig. 11 illustrates the plough with the parts thereof in ploughing position.

As can be seen in these figs. the multi-furrow plough 1 is connected by means of a joint 2 and socket 15 with a tractor of the type described in the aforementioned application or if desired it may be connected with a tractor the rear wheels of which are controlled by means of a differential gear.

The beam 3 of the plough engages with the socket 15 and cannot therefore, be displaced except around the axis thereof being otherwise rigidly connected with the tractor.

Thus when the tractor pitches and rests on the front swivel wheel 5 the plough will be raised and remain suspended behind it.

The socket 15 is integral with the lower end of a vertical stem 16 slidably mounted in sleeves 17. Cooperating with the upper sleeve is a nut 18 operated by a hand-wheel 19 whereby the stem 16 and socket 15 may be adjusted vertically.

On the beam 3 of the plough a yoke is mounted said yoke being in two parts 4, 4' and provided with slots 6, 6' into which bolts 7, 7' engage and serve to secure the parts 4, 4' to the body or beam of the plough the said parts being adjustable and being held in position by said bolts.

Each of said parts 4, 4' has a notch 8, 8' into which a pawl which will be described later, intermittently engages.

The position of the parts 4, 4' can be regulated by displacing them concentrically to the axis of rotation of the plough after loosening and again tightening the bolts 7, 7' so as to raise or lower the notches 8, 8' according to the depth of the furrow in which the tractor wheel is running and in such a manner that the planes of the plough shares or coulters are always vertical the shares being in the same horizontal plane.

A member 10 is provided on the supports of the socket 15 and serves as a bearing for the pivot of an oscillating pawl 11 to which a spring 12 is attached and constantly tends to apply it against the pieces 4, 4' and make it engage in one of the notches 8, 8' as soon as rotation of the plough around its horizontal axis brings one of the notches opposite the said pawl.

The pawl 11 pivoted at 13 can be operated by a rope attached to the tail 14 of the pawl said rope being controlled by a pedal, for example actuated by the foot of the driver of the tractor.

The operation is as follows:

The multiple plow being attached to the tractor with one set of plows in operative position, as shown in Fig. 1, just before reaching the end of a furrow the driver presses down on the pedal to disengage pawl 11 from one of the notches 8, 8'. The plow is now no longer held against the stresses tending to rotate it about the axis of its beam. When therefore the driver removes pressure from the pedal, the pawl not being opposite one of the notches rests on the circumference of the part 4, 4'.

The driver now stops the tractor and then runs it backwards a short distance whereupon, due to the reaction couple developed by the engine or motor, the tractor tips around the axis of its driving wheels bringing the front swivel wheel 5 into contact with the ground and raising the plow shares and mould boards.

As soon as the shares are thus raised, the driver, still running backwards, applies a hand brake 21 to the tractor wheel which is on the unplowed soil. This causes the tractor with the raised plow to swing about the braked wheel as a pivot. During this swinging movement which takes place, the slight contact which the shares have at the commencement of the movement with the soil causes the multiple plow to turn on its axis. This turning movement can, of course, be obtained by distributing the masses of the plow unequally with respect to its axis.

After the tractor has swung around through an angle of about 120 degrees, the driver stops the tractor, releases the brake 21 from the wheel to which it was applied and applies another brake 21 to the other wheel and then runs forward. This causes the tractor to swing about the latter wheel as a pivot. This swinging movement is carried out through an angle of about 60 degrees. Thus the plow and tractor have been swung through an angle of 180 degrees.

Due to the reaction couple developed in changing from backward to forward movement during the swinging movement of the tractor, the plow is applied to the soil upon which it fastens first with the shoe and then with the shares. As simultaneously the plow describes an arc of a circle of about 60 degrees, a turning couple is produced which makes it turn about its axis, the effect being to bring a notch 8 or 8' opposite the pawl 11 which automatically engages therewith under the action of spring 12 to lock the plow against further rotation.

The driver now releases the second brake 21 and starts off in a diametrically opposite direction to that in which he was previously moving.

At each end of the field, the same series of operations is repeated. Regulation of the parts 4, 4' is made once for all when depth of the furrow is fixed.

Instead of arranging the pawl on the tractor and the fixation notches in the plough the inverse arrangement can, of course, be adopted without affecting the invention, the essential feature to obtain the required result being a member which immobilizes the plough automatically after each turning.

The means described constitute the essential means to attain the specified results, but it may be of advantage to supplement them by secondary means making it easier to attain the aforesaid results.

These secondary means consist—

1. In making a supplemental notch on the parts 4, 4' by means of which, during transportation the plough can be placed horizontal with the shares and mouldboards, in the air.

2. In replacing the plough shoe by a swivel wheel which, whilst facilitating the evolutions of the plough makes it possible, together with the fore swivel wheel of the tractor to instantaneously displace the plough from the furrow, moving forwards or backwards, without the addition of any supplemental member.

3. In a regulating device for the fore swivel wheel by means of which any suitable position can be given to this wheel, in relation to the vertical, either with a view to adapting the tractor to all the operations of coupling a ploughing implement or to making the fore-carriage a three wheel tractor.

These secondary means are illustrated by way of example in Figs. 7 to 14 of the accompanying drawings.

As shown in Figs. 7 and 8, the turning device comprises three notches instead of the two notches viz. two 8, 8' on the parts 4, 4' and a notch 8'' forming a median notch, made in an oscillating wing 8ª inserted on the beam 3.

Whilst the plough is working this wing rests on the beam occupying the position shown in unbroken lines in Fig. 9.

In this position it is inoperative and the pawl 11 can pass freely from 8 to 8' during the operation of turning without engaging notch 8". During transportation, on the contrary, this wing is raised by hand to the position indicated in broken lines in Fig. 9, and the pawl 11 engaged, to unite the plough and tractor and keep it horizontal, the shares and mouldboards being in the air.

Another method of obtaining this third notch consists in making a part of the notch in each of the pieces 4, 4'. In this case a hinged wing fixed on the beam and worked by hand would, when required engage the notch 8", working position, or on the contrary leave it open, road position. In the first case, the pawl 11 would pass from 8 to 8' during the operation of turning, without being stopped at 8" and in the second case it would be engaged in 8" and there remain fixing the plough in position for the road. This second method however has the inconvenience of leaving considerable play between the wing and sides of the notch according to the relative positions given in regulating the two pieces constituting the yoke. To support the plough in the road position the shoe represented in Figs. 1 and 2 is replaced by a swivel wheel 24, of suitable diameter, which can pivot under the beam of the plough and support it at any point.

When the plough is fixed by engagement of the pawl 11 in the notch 8" it rests upon the wheel 24 and the plough can be displaced running on the two tractor wheels, on the one hand moving forward on the swivel wheel 24, and backwards on the fore wheel 5 represented in Figs. 1 and 2. In both cases, steering is operated by braking, on the axle of one or other of the driving wheels of the tractor. This application of the wheel 24 is of considerable importance because, for displacements outside the furrows, either in the field or on the road, it avoids the necessity of having a hind-carriage which is always cumbersome, and is also more or less easy to mount and dismount.

The swivel wheel 24 also intervenes when the plough is not fixed in the horizontal position by engagement of the pawl 11 in the notch 8" and when it occupies this position freely during work whilst turning.

When the movement described in paragraph 5 of the operation of the plow is made, when the plough is bginning to describe its arc of circle of 60° the swivel wheel will acquire the position 24', for example, if the brake is put on the left wheel of the tractor or 24" if the right hand wheel is braked. Thus the supporting point of the wheel 24 which is in the vertical plane passing through the longitudinal axis of the plough, is displaced owing to rotation of the pivot of the wheel and the plough dips down by its own weight in the direction requisite for its complete adjustment.

It is to be noted that neither the swivel wheel 24 nor the shoe referred to in the previously described mode of the construction, are essential to permit turning of the plough but they facilitate it to a great extent; moreover the swivel wheel 24 is in this respect more satisfactory than the shoe, a superiority due to the fact that it displaces, as stated, in a suitable direction, the supporting point of the plough at commencement of the turning. To prevent this swivel wheel from trailing on the ground, when the plough is working and the shares engaged in the soil, the following device has been adopted:—

On the axis of the support 25 supporting the wheel and on the opposite side to that where this support supports the axis of the wheel 24, there is a lever 25ª of suitable length to the end of which a spiral spring 26 is attached the spring running along the plough beam 3 and parallel therewith and being fixed thereto by its other extremity. The effect of this spring is that when the wheel does not bear upon the soil, as Fig. 11 the said spring brings the wheel back to the horizontal plane passing through the plough beam, and when the wheel rests on the soil, the spring 26 under the effect of the stresses of re-action which act upon the wheel relaxes and allows the wheel to find its position under the effect of these stresses.

In some special cases the spring 26 can of course, be dispensed with.

Figure 14:
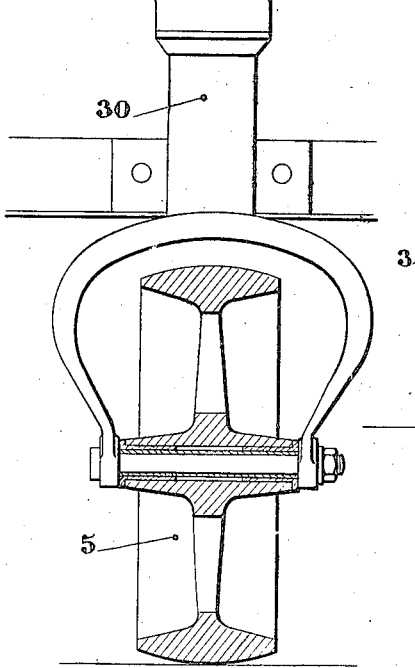
Fig. 14 is a front elevation thereof.
Figure 12:
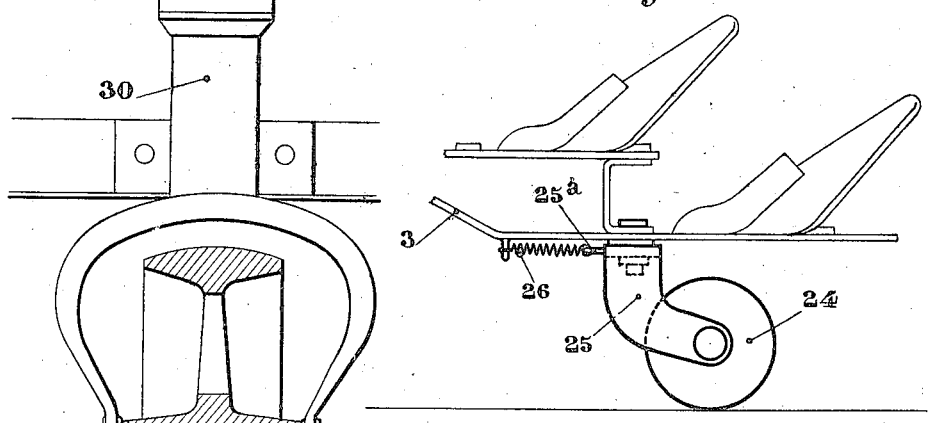
Fig. 12 illustrates a detail.

The fore-wheel 5 as previously stated is capable of being steered and can also be regulated in height by means of the device represented in Figs. 13 and 14.

As can be seen in these figs. the support of the wheel 5 has a cylindrical bar 27 upon which a jacket 28 is keyed, the said jacket being threaded at the upper part 29 and able to turn in the socket 30, interdependent with the frame, the said socket surrounding the outside of the jacket.

A nut 31 upon which a hand wheel 32 is keyed engages with the threads of the jacket 28 and axial displacement is prevented by a stop-piece 33 engaged in a circular opening of the socket 30. Rotary motion given to the hand wheel 33 makes the wheel 5 ascend or descend with regard to the tractor frame.

The swivel wheel can thus be adapted for the part it plays during work, to utilize the re-action couple causing the plough to swing or for work during displacement outside the furrow as the third wheel of an ordinary three wheel tractor.

In the first case, it is made to rise to a suitable height to permit a swinging movement and in the second case it is caused to descend to the extent requisite to carry the tractor.

In both cases its steerability facilitates the evolutions of the appliance and enables its guidance by braking one or the other driving wheel, a mode of steering sometimes better for a heavy fore-carriage, than steerage with screw and sectors.

In this description only the case of a plough coupled to a tractor has been considered, but it is quite evident that the aforementioned means or combination of means could be employed irrespective of the kind of implement coupled with the tractor.

What I claim is:—

1. The combination with a tractor, comprising a pair of rear wheels, means for driving said wheels independently forwards and backwards, brake means for each of said wheels, a front swivel wheel normally elevated above the ground, said tractor being constructed to tip automatically about the axis of said rear wheels to bring said front wheel into engagement with the ground upon backward movement of said tractor, and a socket member carried by said tractor, of a multiple plow, comprising a beam journalled at its forward end in said socket member for movement of rotation about its axis, and two sets of diametrically oppositely arranged plows carried by said beam, and manually releasable means carried in part by said tractor and in part by said multiple plow for automatically locking said beam against rotation with either set of plows in operative position, said beam being adapted to be automatically rotated by reason of the engagement of the tips of the plows with the ground when said tractor is turned at the end of the furrow.

2. A combined mechanism as set forth in claim 1 in which the means for automatically locking the plow beam against rotation comprises a two-part yoke mounted on the beam, each part provided with a notch and said parts being relatively adjustable to vary the distance between said notches, and a spring-pressed lever pivoted on the tractor.

DUBOIS.